United States Statutory Invention Registration [19]

[11] Reg. Number: H700

Farinacci [43] Published: Nov. 7, 1989

[54] PROBE NOSE TRAINING CARTRIDGE

[76] Inventor: Anthony L. Farinacci, 13101 Sanfield Rd., Baldwin, Md. 21013

[21] Appl. No.: 379,320

[22] Filed: Jul. 7, 1989

[51] Int. Cl.[4] ..... F42B 8/00

[52] U.S. Cl. ..... 102/529; 102/501

*Primary Examiner*—Harold J. Tudor

[57] ABSTRACT

The bullet for a training cartridge has a thin probe extending therefrom to reduce its maximum range. The training cartridge provides realistic trajectory, sound, recoil and sighting accuracy and produces identifiable target penetration with reduced risk of richochet and to create the same cartridge profile as a conventional round but with limited range suitable to training purposes. The thin, elongated probe has a blunted nose and joins the main body of the bullet on a tapered surface.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

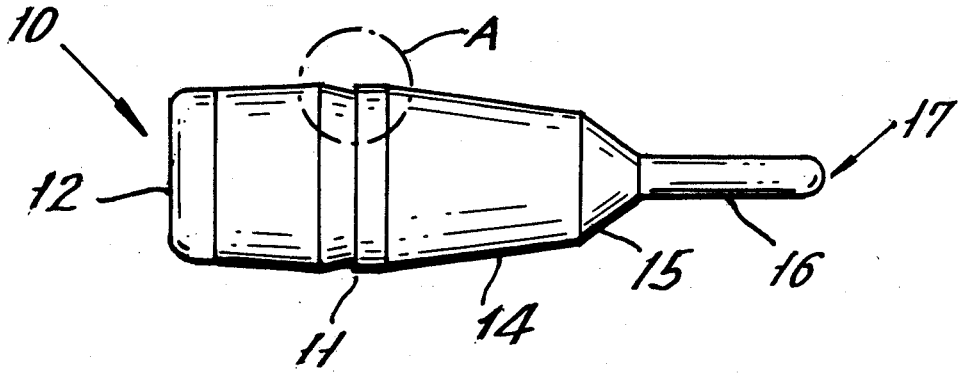

10
11
12
13
14
15
16
17
18
A

PROBE NOSE TRAINING CARTRIDGE

GOVERNMENT INTEREST

The invention described herein was made in the course of or under Contract No. DAAK10-82-C-0236 thereunder with the Government and may be manufactured, used and licensed by or for the Government for Governmental purposes without the payment to us of any royalties thereon.

BACKGROUND OF THE INVENTION

This invention relates to a bullet structure for a conventional cartridge, and more specifically relates to a novel bullet structure which has a limited range suitable for training purposes, but which otherwise reproduces the other important bullet characteristics necessary for training purposes.

Conventional ammunition, particularly machine gun ammunition, is expensive and has a very long range. For example, conventional caliber 0.50 ammunition used in the M2 machine gun with a bullet which complies with the M33 cartridge envelope has a maximum range o approximately 6,700 meters. Such bullets have sufficiently high kinetic energy that, even after interception by a target on a target range, they will carry for extensive distances and will be subject to considerable ricochet. As a result, machine gun training for military personnel is restricted to a few military facilities which have sufficient range.

There exist various types of short-range training ammunition. These, however, do not provide training at realistic target ranges and require the use of a special adapter or recoil amplifier which will cause a conventional weapon to cycle properly, and to exhibit realistic characteristics which are experienced at normal target engagement distances.

BRIEF DESCRIPTION OF THE INVENTION

In accordance with the present invention, a novel bullet having an extending probe-shaped nose is provided which can be assembled with a conventional cartridge case. The extending probe-shaped nose has a blunted end and joins the main body of the bullet at a sharply tapered surface. The bullet will then have a limited maximum range of about 4,000 meters while still providing realistic training characteristics such as realistic sighting accuracy, trajectory, sound and recoil for targets at normal engagement ranges, such as 800 to 1,000 meters.

Thus, maximum range is reduced by about 40% as compared to conventional ammunition. The bullet also complies with the M33 cartridge envelope. In general, the bullet has drag and inertial characteristics which closely match the ballistic characteristics of conventional caliber 0.50 ammunition to a range of 800 to 1,000 meters but has a maximum range of only about 4,000 meters.

The projectile or bullet has sufficient kinetic energy when fired to mark standard military targets. Target penetration also creates a high probability of bending the probe nose to reduce stability and increase drag for further range reduction. The shape of the bullet with its probe-shaped nose and flat face also helps reduce ricochet.

Other features and advantages of the present invention will become apparent from the following description of the invention which refers to the accompanying drawings.

DETAILED DESCRIPTION OF THE DRAWINGS

Figures 1, 2, 3, 4, 5:
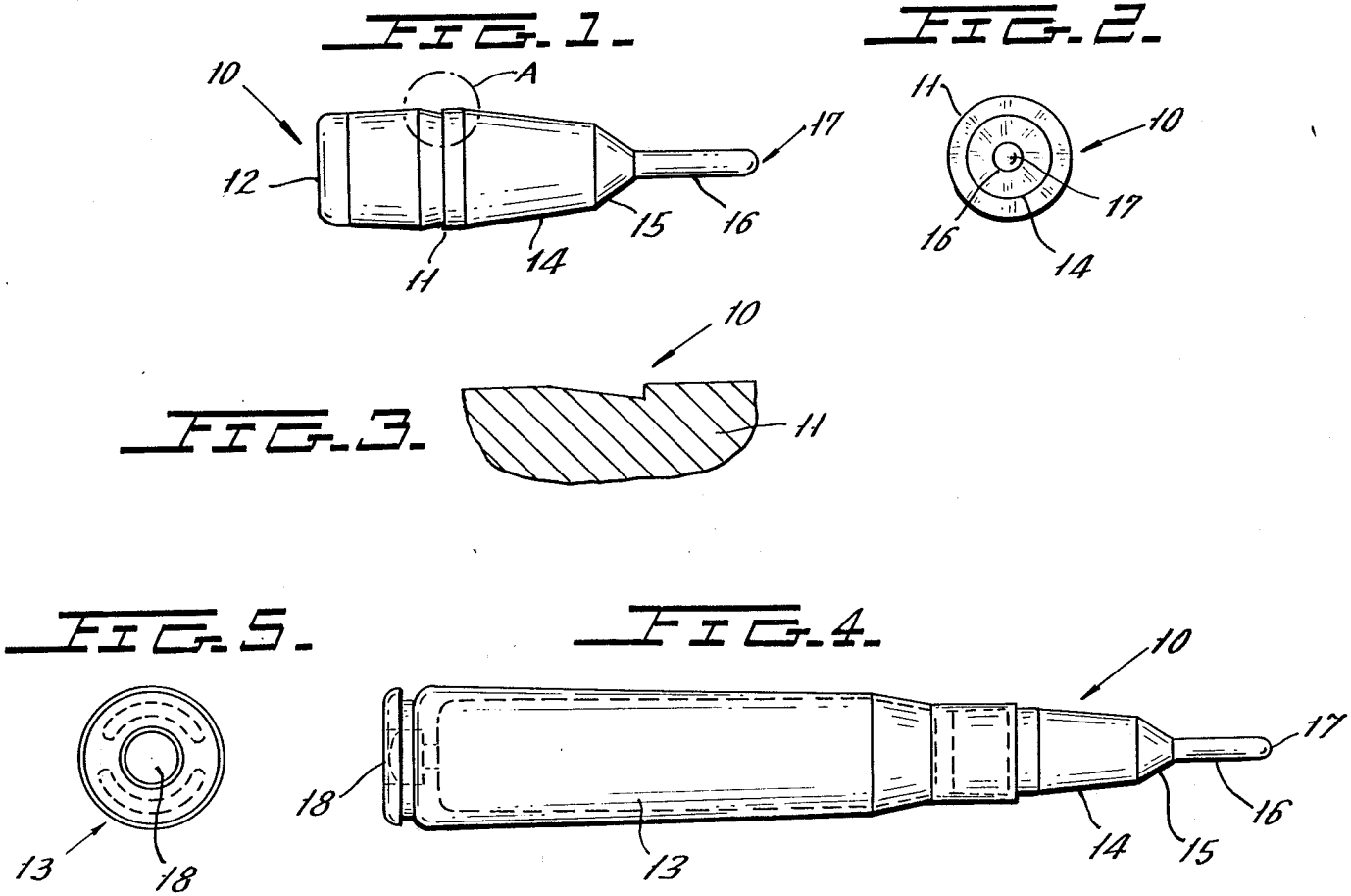
FIG. 1 is a side elevation view of the novel bullet of the present invention.
FIG. 2 is an end view of the probe end of the bullet of FIG. 1.
FIG. 3 is a cross-sectional view of a portion of the major body portion of the bullet of FIG. 1 in the circled area labeled "A" in FIG. 1.
FIG. 4 is a side elevation view of a training cartridge containing the novel bullet of FIGS. 1, 2 and 3.
FIG. 5 is an end view of the left-hand end of the cartridge of FIG. 4.

Referring first to FIGS. 1, 2 and 3, there is shown therein the novel probe nose training bullet 10 which is a monolithic structure preferably made of an annealed leaded steel to provide good machinability or formability. The use of the softer steel will also reduce barrel wear.

The bullet 10 consists of a generally cylindrical body section 11 which extends from a cartridge end 12 suitably tapered for mounting into a standard brass cartridge case 13 as shown in FIGS. 4 and 5. Cartridge case 13 may have the dimensions and structure used for conventional caliber 0.50 cartridges.

The generally cylindrical body section 11 of bullet 10 has a first tapered surface 14 which forms a relatively shallow angle relative to the axis of the bullet 10.

In a typical embodiment of the invention, region 11 will have a maximum diameter of about 0.5 inch and will extend for a length of approximately 1.25 inches. The bullet then has a sharply tapered surface 15 extending over a length of about $\frac{3}{8}$ inch and reduces to a diameter of about 0.125 inch. A probe section 16 then extends from the right-hand end of taper 15 for a length of approximately $\frac{1}{2}$ inch. The actual length of the probe 16 and its diameter can be adjusted depending upon the specific range characteristics which are desired for the device. The end surface 17 of probe 16 is preferably blunted as by having a relatively large diameter as shown in FIG. 1.

FIG. 4 shows the bullet of FIGS. 1, 2 and 3 assembled with a conventional cartridge 13. The cartridge 13 will have a standard primer 18 and a standard propellant can be used for the cartridge. The bullet 10 and cartridge 13 are assembled using standard assembly techniques.

The novel bullet of the present invention is well adapted to machine gun training under limited range conditions. It will be apparent that the novel bullet of the invention is applicable to cartridges for other applications.

The interior ballistics of the round are such that it provides realistic noise, flash, recoil and firing rate without need for special adapters or recoil amplifiers. The projectile has drag and inertial characteristics which provide a close ballistic match to conventional caliber 0.50 ammunition to a range of about 800 to 1,000 meters but it has a maximum range of only about 4,000 meters. This provides realistic sighting practice for the gunner at target ranges normally encountered but reduces maximum bullet travel significantly from the maximum range of approximately 6,700 meters for conventional caliber 0.50 ammunition. The shape of the bullet with the probe nose 16 and flat face also helps reduce ricochet.

The probe 16 accomplishes two objectives: It provides the necessary overall length to ensure automatic bullet feed, and has a relatively blunt nose to increase the bullet drag. The shape of the nose 16 can be varied as desired and the length of the probe 16 can be varied both to adjust drag characteristics and gun feed characteristics as necessary for desired performance.

The bullet 10 has a weight of 480 grains and a muzzle velocity of 3,430 feet per second. Any desired small arms propellant can be used to produce the required interior ballistics within the constraints of the standard military brass cartridge case 13.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A bullet for a training cartridge; said bullet having a generally cylindrical body section, one end of which is receivable into a cartridge case; said cylindrical body section having a first diameter at a given axial position and having an elongated probe section extending from the opposite end of said cylindrical body section; said elongated probe section being coaxial with said cylindrical body section; said elongated probe section having a lateral width which is less than said first diameter and a length which is at least about 25% of the total length of said bullet.

2. The bullet of claim 1 wherein said probe section is cylindrical in cross-section; the diameter of said probe section being less than about ½ of said first diameter.

3. The bullet of claim 1 wherein the free end of said probe section has a blunt nose to increase drag and reduce range.

4. The bullet of claim 2 wherein the free end of said probe section has a blunt nose to increase drag and reduce range.

5. The bullet of claim 4 wherein said blunt nose has a generally arcuate shape.

6. The bullet of claim 1 wherein said cylindrical body section has a first tapered shape extending axially for a first length from a diameter at an axial position adjacent said one end to said first diameter; said first diameter being smaller than said large diameter; said cylindrical body section having a second tapered shape of relatively short length compared to said first length and which extends from said first diameter to the beginning of said probe section.

7. The bullet of claim 6 wherein said probe section is cylindrical in cross-section; the diameter of said probe section being less than about ½ of said first diameter.

8. The bullet of claim 7 wherein the free end of said probe section has a blunt nose to increase drag and reduce range.

9. The bullet of claim 8 wherein said blunt nose has a generally arcuate shape.

10. The bullet of claim 1 wherein said bullet consists of an annealed leaded steel.

11. The bullet of claim 2 wherein said bullet consists of an annealed leaded steel.

12. The bullet of claim 5 wherein said bullet consists of an annealed leaded steel

13. The bullet of claim 6 wherein said bullet consists of an annealed leaded steel.

14. The bullet of claim 9 wherein said bullet consists of an annealed leaded steel.

* * * * *